United States Patent [19]
Hart

[11] Patent Number: 5,320,392
[45] Date of Patent: Jun. 14, 1994

[54] REMOVABLY ATTACHABLE VEHICLE BODY PROTECTION PAD

[76] Inventor: David M. Hart, 4040 Caminito Meliado, San Diego, Calif. 92122

[21] Appl. No.: 47,977

[22] Filed: Apr. 19, 1993

[51] Int. Cl.$^5$ ............................................. B60J 11/00
[52] U.S. Cl. ............................ 293/128; 293/120; 280/770
[58] Field of Search .............. 293/128, 126, 120; 280/770

[56] References Cited

U.S. PATENT DOCUMENTS

| | | |
|---|---|---|
| 2,734,765 | 2/1956 | Henderson et al. |
| 3,147,176 | 9/1964 | Haslam ............... 293/128 X |
| 4,014,583 | 3/1977 | Forbes ............... 293/128 |
| 4,221,412 | 9/1980 | Miller ............... 293/128 X |
| 4,493,502 | 1/1985 | Campbell, Jr. ............... 293/128 |
| 4,498,697 | 2/1985 | McGlone et al. ............... 293/128 |
| 4,531,560 | 7/1985 | Balanky ............... 293/136 X |
| 4,561,685 | 12/1985 | Fischer ............... 293/128 |
| 4,708,380 | 11/1987 | Cruz ............... 293/128 |
| 4,750,767 | 6/1988 | Barnett ............... 293/128 |
| 4,828,303 | 5/1989 | Soria ............... 293/128 |
| 5,112,092 | 5/1992 | Pucci ............... 293/128 |
| 5,129,695 | 7/1992 | Norman, II ............... 293/128 |

FOREIGN PATENT DOCUMENTS

| | | |
|---|---|---|
| 689935 | 7/1964 | Canada . |
| 511441 | 10/1930 | Fed. Rep. of Germany . |
| 1077058 | 11/1954 | France . |

*Primary Examiner*—Joseph D. Pape
*Attorney, Agent, or Firm*—Thomas I. Rozsa; Tony D. Chen

[57] ABSTRACT

The present invention is a removably attachable vehicle body protection pad which is designed to be placed on the doors of a vehicle in a removable fashion when the vehicle is parked, so that the vehicle is protected when people in adjacent vehicles open their doors. The present invention provides a protection for the vehicle from being scratched or dented by other vehicles. The removably attachable pad includes an impact absorbent member having a fabric front surface and a plastic back surface, one or more magnetic strips for attaching the pad to a vehicle body, and one or more handle holes for holding the pad and fastening a security cable.

21 Claims, 1 Drawing Sheet

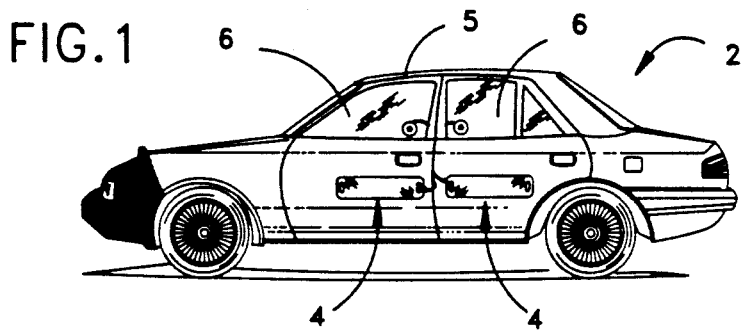
FIG. 1
FIG. 2
FIG. 4
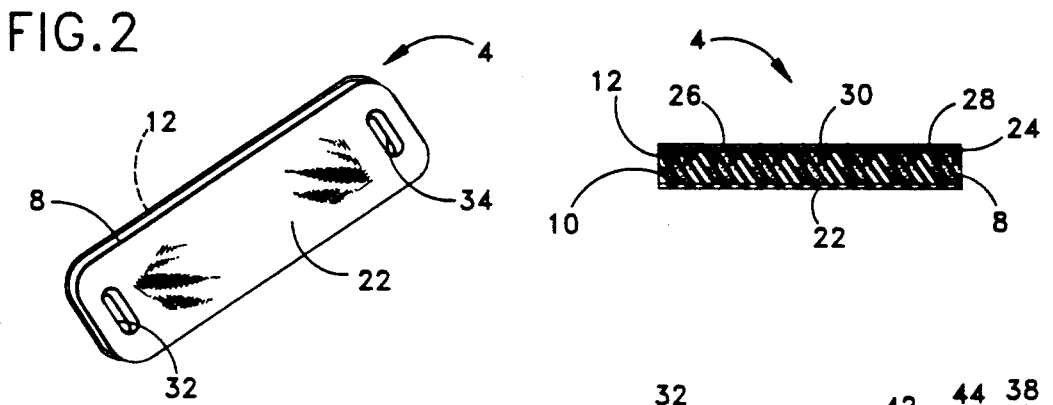
FIG. 3
FIG. 5
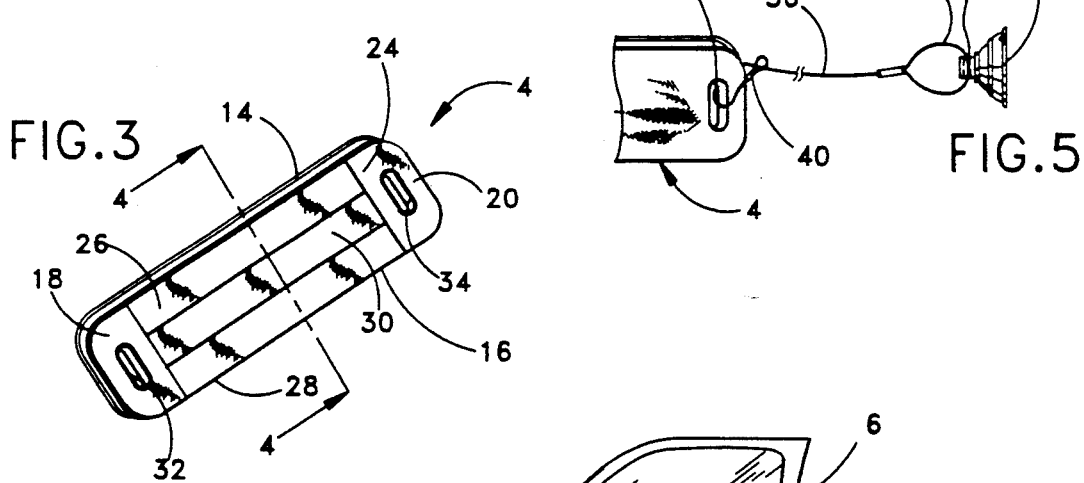
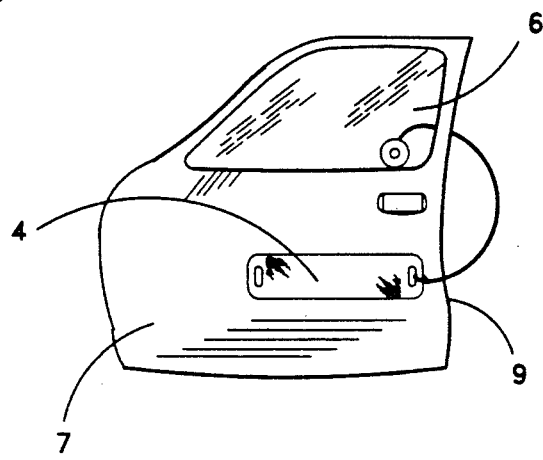
FIG. 6

REMOVABLY ATTACHABLE VEHICLE BODY PROTECTION PAD

BACKGROUND OF THE INVENTION

1. Field of The Invention

The present invention relates to the field of vehicle moldings. In particular, the present invention relates to a removably attachable vehicle body protection pad for protecting the side doors of a vehicle.

2. Description of The Prior Art

In general, the concept of side moldings for a vehicle has been seen in the prior art. Numerous patents exist for devices which protect the side doors of a vehicle from scratches and dents. These scratches and dents occur when a parked vehicle is struck by the opened door of another closely parked vehicle. The problem with some of these devices in today's market is that they are too expensive to be manufactured, do not function adequately, or require a considerable amount of time to install, remove, and store. In addition, while most previous products provide only a narrow strip of protection, this device provides a wider range of protection in areas where scratches and dents actually occur. The vehicles can be manufactured with side moldings already installed by the manufacturer, but it can be very expensive at times because it is an optional item for the vehicle. In addition, such side moldings are usually very small and offer only minimal protection. Some vehicles do not come with side moldings. This is where the present invention comes into play. The following prior art references are relevant to the field of the present invention.

1. U.S. Pat. No. 2,734,765 issued to Henderson et al. on Feb. 14, 1956 for "Door Protecting Accessory For Vehicles" (hereafter "the Henderson Patent").

2. U.S. Pat. No. 4,221,412 issued to Miller on Sep. 9, 1980 for "Extendable Vehicle Lateral Guard" (hereafter "the Miller Patent").

3. U.S. Pat. No. 4,493,502 issued to Campbell, Jr. on Jan. 15, 1985 for "Car Body Guard" (hereafter "the Campbell Patent").

4. U.S. Pat. No. 4,498,697 issued to McGlone et al. on Feb. 12, 1985 for "Portable, Positionable Locking Magnetic Molding Tubes For Vehicle Protection" (hereafter "the McGlone Patent").

5. U.S. Pat. No. 4,531,560 issued to Balanky on Jul. 30, 1985 for "Protective Cover For Vehicles" (hereafter "the Balanky Patent").

6. U.S. Pat. No. 4,561,685 issued to Fischer on Dec. 31, 1985 for "Protective Pad For Side Of Motor Vehicle" (hereafter "the Fischer Patent").

7. Canadian Patent No. 689,935 issued to Parker on Jul. 7, 1964 for "Car Door Protector" (hereafter "the Canadian Patent").

8. German Patent No. 511,441 issued to Harbig on Oct. 30, 1930 (hereafter "the German Patent").

9. French Patent No. 1,077,058 issued to Schwob on Nov. 4, 1954 (hereafter "the French Patent").

The Henderson Patent discloses a door protecting accessory for vehicles. A longitudinally extending recess is provided in the outer face of the body and the recess is enlarged at its inner side edges for accommodating an elongated strip of metal which acts not only as a reinforcement for the device but also as an ornament. The device is attached to the outer side of the door by suction cups.

The Miller Patent discloses an extendable vehicle lateral side guard. It includes a strip extending outward and away from the exterior surface of the vehicle door. The strip is rigidly fixed to a pair of parallel arms which are arcuate in shape and which extend through the outer surface of the door. The arms are connected at their opposite ends to a U-shaped frame having vertical bars and a cross-bar integrally connected and rigidly fixed to the ends of the arms.

The Campbell Patent discloses a car body guard. It includes an elongated flexible rubber strap rolled up in a housing which is mounted in one of the wheel wells of the car. The strap may be unwound from the housing and extended across the side of the car and have its free end fastened to an attachment member in the other wheel well on the same side of the car. A return spring retains the strap along the side of the car and rolls it up again in the housing after it is detached from the attachment member in the other wheel well.

The Fischer Patent discloses a protective pad for the side of a motor vehicle. A hollow plastic pipe is encased with foam. The hollow plastic pipe is suspended by flexible belts which hang in a generally inverted Y shaped configuration and which is attached to the door of the vehicle.

The McGlone Patent discloses portable, positionable, locking magnetic molding tubes for vehicle protection. It includes an extruded tubing of a "D" channel configuration which adheres to any ferrous surface by means of an adhesively attached magnetic strip which is attached to the length of the molding in the underside recess of the "D" channel. The molding incorporates an internal flat semi-rigid member that maintains the molding in a straight and lateral attitude when attached to a ferrous panel. It also includes a circumferential locking device consisting of a coated wire retainer loop culminating in two reverse-band locking members. The locking device fits over the molding and the distally protruding locking members are then available for attaching to panel edges or the inside lip of vehicle doors to prevent theft.

The Balanky Patent discloses a protective cover for vehicles. The protective cover can be placed on or removed from the front and sides of a vehicle to protect its finish.

The Canadian Patent discloses a car door protector including two hook means attached at opposite ends of an elongated tether. The two hook means are hooked at opposite ends of the vehicle door edge.

The German Patent discloses a sectional railing attachment for a car. It includes several rails which attach to specific sections of the car such as the doors and fenders.

The French Patent discloses spaced apart cushioning members attached from end to end of the car.

One disadvantage of the prior art patents is that they use elaborate components and are therefore too expensive to manufacture. Another disadvantage of the prior art patents is that they use adhesive to attach the side molding onto the exterior surface of the vehicle. The adhesive can lose its adherence as time passes and the side molding will fall off the vehicle when the adhesive is not in effect.

Therefore, there is always a need to improve the side moldings of vehicles which will prevent scratches and dents on the side of the vehicle. It is also desirable to design a side molding that can easily be detached from the side door of the vehicle, so that the side molding can be removed when the vehicle is in motion. It is also desirable to design a side molding that can withstand adverse weather conditions, so that the side molding can be left on the vehicle while it is parked.

SUMMARY OF THE INVENTION

The present invention is a novel and unique removably attachable vehicle body protection pad useful for protecting the side doors of a vehicle. It is designed to be placed on the side doors of the vehicle in a removable fashion when the vehicle is parked, so that the vehicle is protected when people in adjacent vehicles open their doors. The present invention provides a considerably better protection in an easily manufacturable and low cost configuration, so that the side of the vehicle will not be dented. The present invention can be used on most vehicles because it utilizes flexible materials which conform to the shape of a vehicle and magnetic strips which allow it to be removably attached to any ferrous surface. The present invention also provides a wider area of protection on the vehicle.

Many vehicle owners are interested in a device for protecting the side doors of the vehicle which: (a) is easy to adapt to their particular model of vehicle; (b) is inexpensive; (c) has an attractive design; (d) can be easily stored away when not in use; and (e) provides a substantial protective cushioning effect to offset the battering from the doors of other vehicles which may be opened toward the vehicle being protected.

Portions of the present invention can be manufactured in various colors and because of the various color designs, the present invention can conform to the color of the vehicle to which it is attached.

It has been discovered, according to the present invention, that if the removably attachable vehicle body protection pad has a nylon fabric surface, it will permit the use of inks thereon for displaying a variety of designs and personalizing the product. The nylon surface further enables the product to be tear- and abrasion-resistant.

It has also been discovered, according to the present invention, that if the removably attachable vehicle body protection pad has a core which is made out of rubber material, it will provide an improved shock absorber protection and thereby protect the vehicle from scratches and dents caused by other vehicles.

It has further been discovered, according to the present invention, that if the removably attachable vehicle body protection pad has a modified polyethylene back surface, it will provide an improved surface for adhesive purposes, and also provides a penetration barrier and thereby prevents dents and scratches.

It has additionally been discovered, according to the present invention, that if the removably attachable vehicle body protection pad has flexible magnetic strips attached to the back surface, it will provide a simplistic way to attach or remove the removably attachable vehicle body protection pad to or from the exterior surface of the vehicle.

It has further been discovered, according to the present invention, that if a flexible nylon-coated steel cable is attached to the removably attachable vehicle body protection pad, it will provide theft protection for the removably attachable vehicle body protection pad.

It is therefore an object of the present invention to provide flexible magnetic strips on the removably attachable vehicle body protection pad, so that the apparatus can be removed from the vehicle.

It is also an object of the present invention to provide a removably attachable vehicle body protection pad device for protecting the exterior surfaces of a vehicle from scratches and dents caused by adjacent vehicles.

It is a further object of the present invention to provide a flexible nylon-coated steel cable and a suction cup, to allow one end of the cable to be looped to the removably attachable vehicle body protection pad and the other end affixed to the suction cup which is attached to the interior window of a vehicle, to prevent the removably attachable vehicle body protection pad from being lost or stolen.

In the embodiment of the present invention, the removably attachable vehicle body protection pad has a construction which includes the following features: an elongated resilient member made from a blend of neoprene, ethylene propylene terpolymer (EPT) and styrene butadiene rubber (SBR) materials; an elongated thin nylon fabric member attached to the front surface of the elongated resilient member which permits the use of inks for displaying a variety of designs; a first elongated thin plastic member made out of modified polyethylene (MPE) attached to the back surface of the elongated resilient member; two elongated flexible magnetic strips attached to the back surface of the first elongated thin plastic member for providing means of attaching and removing the present invention; a second elongated thin plastic member made out of modified polyethylene (MPE) attached to the back surface of the first elongated thin plastic member; and an elongated nylon-coated stainless steel cable and a suction cup (attached to an interior window surface) for securing the removably attachable vehicle body protection pad from being lost or stolen.

In addition, the manufacturing costs would be much lower in the present invention, as compared to the prior art. The lower manufacturing costs could be passed on to the consumer thereby providing a less expensive means for protecting the side doors of a vehicle.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a perspective view of a vehicle and the embodiment of the present invention removably attachable vehicle body protection pad attached to the doors of the vehicle.

FIG. 2 is a front perspective view of the embodiment of the present invention removably attachable vehicle body protection pad.

FIG. 3 is a rear perspective view of the embodiment of the present invention removably attachable vehicle body protection pad with two elongated flexible magnetic strips.

FIG. 4 is an enlarged cross-sectional view taken along line 4—4 of FIG. 3.

FIG. 5 is a perspective view of a suction cup and an elongated security cable looped to the present invention removably attachable vehicle body protection pad.

FIG. 6 is an illustrative view showing how the present invention removably attachable vehicle body protection pad is removably attached to a door of a vehicle.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIG. 1, there is shown a multiplicity of removably attachable vehicle body protection pads 4 for protecting the doors of a vehicle 2 from scratches and dents caused by adjacent parked vehicles.

One of the unique features of the removably attachable vehicle body protection pad 4 is that it can be attached to any ferrous surface. Another unique feature of the removably attachable vehicle body protection pad 4 is that it is generally a flat surface which absorbs sudden impact from other vehicle doors and can be utilized in many situations. By way of example, not only can the removably attachable vehicle body protection pad 4 protect the doors of a vehicle 2, it can also be used as a vehicle rack. By having a multiplicity of vehicle body protection pads 4 attached to the roof 5 of the vehicle 2, objects such as luggage can be placed on top of the vehicle body protection pads 4 and tied down with rope and transported to one's destination. The vehicle body protection pads 4 would protect the painted surfaces of the vehicle 2. The vehicle body protection pad also provides a wider area of protection than most vehicle protectors.

Another possible use is to affix reflective tape to the surface such that this device can serve as a safety device for disabled vehicles. Also, it can be used as a kneepad when making emergency auto repairs e.g. when fixing a flat tire.

Referring to FIGS. 2, 3 and 4, there is shown the present invention removably attachable vehicle body protection pad 4. The removably attachable vehicle body protection pad 4 comprises an elongated resilient member 8 with a front surface 10, a back surface 12, two opposite edges 14 and 16, and two opposite ends 18 and 20. The two opposite ends 18 and 20 are generally semi-ovular shaped. The elongated resilient member 8 is generally rectangular shaped and can be made from a blend of neoprene, ethylene propylene terpolymer (EPT) and styrene butadiene rubber (SBR). By way of example, the elongated resilient member 8 is approximately 24.0 inches in length, 6.0 inches in width and 0.375 inches in thickness respectively.

There is shown an elongated thin nylon fabric member 22 which is attached to the front surface 10 of the elongated resilient member 8 by adhesive means. The nylon fabric member 22 permits the use of inks for displaying a variety of designs. It is made out of lightweight nylon stretch jersey fabric with a weight of 2.4 oz/yd$^2$, a length stretch of 150 and a width stretch of 225. This nylon fabric member 22 is tear and abrasion resistant. There is also shown a first elongated thin plastic member 24 which is made out of a modified polyethylene (MPE) and is attached to the back surface 12 of the elongated resilient member 8 by adhesive means. The first elongated thin plastic member 24 is corona treated which increases the bondability of the adhesive between the thin plastic member 24 and the resilient member 8. Corona treating is an electrostatic process and without this process, the thin plastic member 24 will not adhere to the elongated resilient member 8. By way of example, the first elongated thin plastic 24 is approximately 24.0 inches in length, 6.0 inches in width and 0.016 inches in thickness respectively.

It will be appreciated that these dimensions as described above are merely one illustrative embodiment and can include many other comparable sets of dimensions.

Two spaced apart elongated flexible magnetic strips 26 and 28 are affixed to the first elongated thin plastic member 24 and located adjacent to the two respective opposite edges 14 and 16 of the elongated resilient member 8 with a space between them. A second elongated thin plastic member 30 is made out of the same MPE material and corona treated which increases the bondability of adhesives. The second elongated thin plastic is affixed by adhesive means onto the surface of the first elongated thin plastic member 24 in the space between the two elongated flexible magnetic strips 26 and 28. The second elongated thin plastic member 30 is located between the two elongated flexible magnetic strips 26 and 28. By way of example, the size of the second elongated thin plastic 30 is approximately 18.0 inches in length, 2.0 inches in width and 0.023 inches in thickness respectively. The purpose of this second elongated thin plastic member 30 is to provide additional penetration protection.

The two handle holes 32 and 34 are located on each of the two opposite ends 18 and 20 of the elongated resilient member 8. These handle holes 32 and 34 are utilized for holding the removably attachable vehicle body protection pad 4 and for attaching a security cable 36.

Referring to FIG. 5, there is shown a portion of a removably attachable vehicle body protection pad 4 attached to the security cable 36 with a suction cup 38. The security cable 36 and the suction cup 38 are utilized as a security device for the removably attachable vehicle body protection pad 4. The present invention can be utilized with or without the security cable 36 and the suction cup 38. The first end 40 of the security cable 36 is looped through one of the two handle holes 32 as shown. The suction cup 38 has a side hole 44 for accommodating the second end 42 of the security cable 36. The suction cup 38 is attached to an interior surface of a window of the vehicle. The security cable 36 is utilized for securing the removably attachable vehicle body protection pad 4 and thereby preventing it from being stolen. By way of example, the security cable 36 is made out of nylon-coated stainless steel and the suction cup 38 is made out of vinyl.

Using this type of security device does not require any additional hardware or drilling of holes on the vehicle to retain the removably attachable vehicle body protection pad 4 on the vehicle. It is emphasized that while this type of security device is preferred, it is also within the spirit and scope of the present invention to have a different retaining means incorporated into the removably attachable vehicle body protection pad 4.

Referring to FIGS. 5 and 6, in operation, the removably attachable vehicle body protection pad 4 is placed against the door 7 of the vehicle and is retained thereon by the two elongated flexible magnetic strips. The first end 40 of security cable 36 is looped through either one of the handle holes and the second end 42 of the security cable is attached to the suction cup 38. The security cable 36 is slipped around the door edge 9 of the vehicle so that the suction cup 38 can be attached to the interior surface of the window 6, as shown in FIG. 6, which secures the removably attachable vehicle body protection pad 4 and provides a deterrent from being stolen.

The present invention provides substantial cushioning to withstand the blows from the doors of other vehicles but at the same time is sufficiently flexible to conform to the same shape of a number of vehicle doors.

Defined in detail, the present invention is a removably attachable protection pad for protecting a vehicle from scratches and dents caused by adjacent vehicles, the vehicle having doors and windows, the removably attachable protection pad comprising: (a) an elongated resilient member having a front surface, a back surface, a first edge, a second edge, a first end and a second end; (b) an elongated thin nylon fabric member affixed to said front surface of said elongated resilient member; (c) a first elongated thin plastic member affixed to said back surface of said elongated resilient member; (d) a first elongated flexible magnetic strip affixed to said first elongated thin plastic member with one longitudinal edge located adjacent to said first edge of said elongated resiliant member; (e) a second elongated flexible magnetic strip spaced apart from said first elongated flexible magnetic strip, the second elongated flexible magnetic strip affixed to said first elongated thin plastic member with one longitudinal edge located adjacent to said second edge of said elongated resilient member so that a space exists between said first and second elongated flexible magnetic strips; (f) a second elongated thin plastic member affixed to said first elongated thin plastic member and located between said first and second elongated flexible magnetic strips; (g) a first handle hole for holding said removably attachable protection pad and located on said first end of said elongated resilient member; (h) a second handle hole for holding said removably attachable protection pad and located on said second end of said elongated resilient member; and (i) a suction cup attached to said second end of said elongated security cable; (j) whereby said removably attachable protection pad is placed against said door of said vehicle and retained on said vehicle by said first and second elongated flexible magnetic strips for protecting said vehicle from scratches and dents caused by adjacent vehicles, and said suction cup is attached to an interior surface of said window of said vehicle with said elongated security cable passing around a door edge of said vehicle for securing said removably attachable protection pad from being stolen.

Defined broadly, the present invention is a removably attachable protection pad for protecting a vehicle from scratches and dents caused by adjacent vehicles, the vehicle having doors and windows, the removably attachable protection pad comprising: (a) a resilient member having a front surface, a back surface, two opposite edges, two opposite ends; (b) a nylon fabric member affixed to said front surface of said resilient member; (c) a first plastic member affixed to said back surface of said resilient member; (d) two magnetic strips affixed to said first plastic member at spaced apart locations; (e) a second plastic member affixed to said first plastic member and located between said two magnetic strips; (f) at least one handle hole for holding said removably attachable protection pad and located on a respective one of said two opposite ends of said resilient member; and (g) a cable having a first end and a second end, the first end being looped through said at least one handle hole of said resilient member, and the second end attached to a suction cup; (h) whereby said removably attachable protection pad is placed against said door of said vehicle and retained on said vehicle by said two magnetic strips for protecting said vehicle from scratches and dents caused by adjacent vehicles, and said suction cup is attached to an interior surface of said window of said vehicle with said cable passing around a door edge of said vehicle for securing said removably attachable protection pad from being stolen.

Defined more broadly, the present invention is a removably attachable pad for protecting an exterior surface of a vehicle from scratches and dents, comprising: (a) an impact absorbent member having a front surface and a back surface; (b) a fabric layer affixed to said front surface of said impact absorbent member; (c) a plastic member affixed to said back surface of said impact absorbent member; (d) at least one magnetic strip attached to said plastic member; and (e) at least one handle hole in said impact absorbing member for holding said removably attachable pad; (f) whereby said removably attachable pad is placed on said exterior surface of said vehicle and retained thereon by said at least one magnetic strip.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A removably attachable protection pad for protecting a vehicle from scratches and dents caused by adjacent vehicles, the vehicle having doors and windows, the removably attachable protection pad comprising:
   a. an elongated resilient member having a front surface, a back surface, a first edge, a second edge, a first end and a second end;
   b. an elongated thin nylon fabric member affixed to said front surface of said elongated resilient member;
   c. a first elongated thin plastic member affixed to said back surface of said elongated resilient member;
   d. a first elongated flexible magnetic strip affixed to said first elongated thin plastic member with one longitudinal edge located adjacent to said first edge of said elongated resilient member;
   e. a second elongated flexible magnetic strip spaced apart from said first elongated flexible magnetic strip, the second elongated flexible magnetic strip affixed to said first elongated thin plastic member with one longitudinal edge located adjacent to said second edge of said elongated resilient member so that a space exists between said first and second elongated flexible magnetic strips;

f. a second elongated thin plastic member affixed to said first elongated thin plastic member and located between said first and second elongated flexible magnetic strips;

g. a first handle hole for holding said removably attachable protection pad and located on said first end of said elongated resilient member;

h. a second handle hole for holding said removably attachable protection pad and located on said second end of said elongated resilient member;

i. an elongated security cable having a first end and a second end, the first end being looped through said first handle hole;

j. a suction cup attached to said second end of said elongated security cable;

k. whereby said removably attachable protection pad is placed against said door of said vehicle and retained on said vehicle by said first and second elongated flexible magnetic strips for protecting said vehicle from scratches and dents caused by adjacent vehicles, and said suction cup is attached to an interior surface of said window of said vehicle with said elongated security cable passing around a door edge of said vehicle for securing said removably attachable protection pad from being stolen.

2. The invention as defined in claim 1 wherein said elongated resilient member is made from a blend of neoprene rubber, ethylene propylene terpolymer rubber and styrene butadiene rubber.

3. The invention as defined in claim 1 wherein said elongated thin nylon fabric member and said first elongated thin plastic member are affixed to said elongated resilient member by adhesive means, and said second elongated thin plastic member is affixed to said first elongated thin plastic member by adhesive means.

4. The invention as defined in claim 1 wherein said first and second elongated flexible magnetic strips are affixed to said first elongated thin plastic member by adhesive means.

5. The invention as defined in claim 1 wherein said first and second elongated thin plastic members are made out of modified polyethylene.

6. The invention as defined in claim 5 wherein said modified polyethylene is corona treated.

7. The invention as defined in claim 1 wherein said elongated security cable is made out of nylon-coated stainless steel.

8. The invention as defined in claim 1 wherein said suction cup is made out of vinyl material.

9. A removably attachable protection pad for protecting a vehicle from scratches and dents caused by adjacent vehicles, the vehicle having doors and windows, the removably attachable protection pad comprising:

a. a resilient member having a front surface, a back surface, two opposite edges, two opposite ends;

b. a nylon fabric member affixed to said front surface of said resilient member;

c. a first plastic member affixed to said back surface of said resilient member;

d. two magnetic strips affixed to said first plastic member at spaced apart locations;

e. a second plastic member affixed to said first plastic member and located between said two magnetic strips;

f. at least one handle hole for holding said removably attachable protection pad and located on a respective one of said two opposite ends of said resilient member; and g. a cable having a first end and a second end, the first end being looped through said at least one handle hole of said resilient member, and the second end attached to a suction cup;

h. whereby said removably attachable protection pad is placed against said door of said vehicle and retained on said vehicle by said two magnetic strips for protecting said vehicle from scratches and dents caused by adjacent vehicles, and said suction cup is attached to an interior surface of said window of said vehicle with said cable passing around a door edge of said vehicle for securing said removably attachable protection pad from being stolen.

10. The invention as defined in claim 9 wherein said resilient member is made from a blend of neoprene rubber, ethylene propylene terpolymer rubber and styrene butadiene rubber.

11. The invention as defined in claim 9 wherein said nylon fabric member and said first plastic member are affixed to said resilient member by adhesive means, and said second plastic member is affixed to said first plastic member by adhesive means.

12. The invention as defined in claim 9 wherein said two magnetic strips are affixed to said first plastic member by adhesive means.

13. The invention as defined in claim 9 wherein said first and second plastic members are made out of modified polyethylene.

14. The invention as defined in claim 13 wherein said modified polyethylene is corona treated.

15. The invention as defined in claim 9 wherein said cable is made out of nylon-coated stainless steel.

16. The invention as defined in claim 9 wherein said suction cup is made out of vinyl material.

17. A removably attachable pad for protecting an exterior surface of a vehicle from scratches and dents, comprising:

a. an impact absorbent member having a front surface and a back surface;

b. a fabric layer affixed to said front surface of said impact absorbent member;

c. a plastic member affixed to said back surface of said impact absorbent member;

d. at least one magnetic strip attached to said plastic member; and e. at least one handle hole in said impact absorbing member for holding said removably attachable pad;

f. whereby said removably attachable pad is placed on said exterior surface of said vehicle and retained thereon by said at least one magnetic strip.

18. The invention as defined in claim 17 wherein said impact absorbent member is made out of rubber.

19. The invention as defined in claim 17 wherein said fabric layer is made out of nylon material.

20. The invention as defined in claim 17 wherein said plastic member is made out of modified polyethylene and corona treated.

21. The invention as defined in claim 17 further comprising a security member looped through said at least one handle to prevent theft of the removably attachable pad.

* * * * *